US 6,655,252 B2

(12) United States Patent
Epple

(10) Patent No.: US 6,655,252 B2
(45) Date of Patent: Dec. 2, 2003

(54) CONVEYOR DEVICE FOR MITER-BOX SAWS

(75) Inventor: Bertold Epple, Kappelrodeck (DE)

(73) Assignee: Keuro Besitz GmbH & Co. EDV-Dienstleistungs KG, Achern (DE)

( * ) Notice: Subject to any disclaimer, the term of this patent is extended or adjusted under 35 U.S.C. 154(b) by 196 days.

(21) Appl. No.: 09/902,969

(22) Filed: Jul. 11, 2001

(65) Prior Publication Data
US 2002/0020610 A1 Feb. 21, 2002

(30) Foreign Application Priority Data
Jul. 14, 2000 (DE) .......................... 100 34 244

(51) Int. Cl.[7] .............. B26D 7/01; B26D 7/06; B27B 13/04
(52) U.S. Cl. .............. 83/732; 83/734; 83/435.11; 83/435.2; 83/436.1; 83/436.7; 83/810; 83/581
(58) Field of Search ............... 83/435.11, 435.2, 83/436.1, 436.7, 734, 809, 810, 581, 732

(56) References Cited
U.S. PATENT DOCUMENTS 3,111,054 A * 11/1963 Tishken ............... 83/581 X
4,206,673 A *  6/1980 Detjen ............... 83/435.2 X
5,947,173 A *  9/1999 Miyamoto ........... 83/435.11 X

FOREIGN PATENT DOCUMENTS

| DE | 3105470 A1 | 9/1982 |
| DE | 3127748 B1 | 2/1983 |
| DE | 4040470.6 | 7/1992 |
| JP | 05104325 | 4/1993 |
| JP | 05116024 | 5/1993 |
| JP | 11207521 | 8/1999 |

* cited by examiner

Primary Examiner—Charles Goodman
(74) Attorney, Agent, or Firm—Volpe and Koenig, P.C.

(57) ABSTRACT

A conveyor device for miter-box saws which is arranged for movement horizontally perpendicular in relation to the direction of conveyance in order to be able to avoid any possible swivelling of the miter-box saw. The horizontal travel of the conveyor device takes place in part and in a swivelling direction due to the swivelling motion of the saw itself.

16 Claims, 4 Drawing Sheets

CONVEYOR DEVICE FOR MITER-BOX SAWS

BACKGROUND

The invention relates to a conveyor device for miter-box saws whereby the conveyor device is arranged on the inlet and/or outlet side of a miter-box saw that is swiveable in the horizontal plane and serves to transport the workpiece to be processed to the saw or away from the saw, and whereby the conveyor device is especially arranged horizontally movable perpendicular in relation to the direction of conveyance in order to be able to evade any swiveling of the saw.

Conveyor devices of this type usually consist of roller trains which extend as close to the cutting plane of the saw as possible in order to be able to process the bar material as completely as possible and consequently to be able to transport even the shortest residue pieces or approach pieces away. If now, however, the conveyor device is arranged this close to the machine, then it extends at least partially also into the swiveling region of the miter-box saw and would restrict this to the extent that the conveyance device were not movable horizontally out of the swiveling range.

For this reason, it is known in the state of the art to arrange conveyor devices close to the machine so that they are horizontally movable perpendicular in relation to the direction of conveyance, whereby the horizontal movement takes place through a chain drive which executes the transport movement of the conveyor device as a function of the swiveling angle of the miter-box saw. Since as the pivot angle of the miter-box saw becomes greater, the workpiece width to be processed diminishes, the width available for the conveyor device can also diminish to a corresponding extent without this leading to a basic impairment of the function of saw and conveyor device. On the other hand, when the miter-box saw is in the initial position and not swivelled, a material breadth corresponding almost to the entire conveyance width is processable so that horizontal transport of the conveyor device cannot be avoided even through simply narrower roller trains near the tool which from the start continuously leave free the pivoting range of the miter-box saw.

SUMMARY

Proceeding from this, underlying the preceding invention is the object of improving a conveyor device for miter-box saws of the above-mentioned type, and especially to simplify its construction and mode of operation.

This object is accomplished in accordance with the invention in that the horizontal transport of the conveyor device takes place at least in part and in a direction of travel through the swivelling motion of the saw. In this way, one can at least spare a horizontal transport drive in the one swivelling direction and moreover a complicated control unit which takes into consideration the swivelling motion of the saw in the horizontal transport of the conveyor device. For if the horizontal transport is executed by the miter-box saw itself or through its pivot drive, then the extent of the transport motion is always exactly adapted to the swivelling motion of the miter-box saw and consequently to the necessary measure.

This coupling of the conveyor device and the miter-box saw is especially advantageous when the conveyor device lies under a preloading at a stop in the initial position and is movable back into the initial position by a drive means generating a preload in the opposite direction. In this way, one receives travel motions in both directions without separate travel drive. Rather it suffices to use the swivel drive of the miter-box say for the travel direction in the one direction and the preloading of a drive means for the travel motion in the other direction. Similar to the travel drive made available through the swivelling motion in the one direction, the preloading in the other direction, which always presses the conveyor device against the swivelled miter-box saw or in the initial position against the stop, ensures a position of the conveyor device adapted precisely to the miter-box saw so that even here no internal control unit is necessary for determining the path of travel.

It is especially advantageous if the drive means generating the preloading is a tension station which generates the preloading with the aid of a weight engaging on the conveyor device, in particular with the aid of a chain, so that this drive means conceivably can be simply configured, and the preloading force also does not subside during the lifetime of the conveyor device, and is adjustable trouble free.

As already known in connection with the previously described state of the art, the conveyor device also appropriately includes a roller train with several driven conveyor rollers, whereby the conveyor rollers arranged more distantly from the saw for compensation for lateral travel of the conveyor device relative to the conveyor range proper are built wider than the roller trains corresponding to the conveyor region. In this way, it is assured that even when the conveyor device is transported on the basis of the conveyor roller close to the machine, the conveyor rollers lying further away from the saw project corresponding to the maximum swivelling angle of the miter-box saw further in the direction of the swivelled saw and consequently into the conveyance area proper. In this way, the arrangement of the conveyor rollers of the roller train takes place with a stepped or graduated outer contour in order to position itself on the swivelled miter-box saw and consequently to be able to use the conveyance region outside the swivelling range fully.

In order to simplify the horizontal travel of the conveyor device, it is appropriately mounted on linear guides in the direction of conveyance and conveyable over these. In this way, the rolling resistance or resistance to travel drops considerably, and despite unfavorable leverage conditions of the swivelled miter-box saw engaging on the conveyor device, the swivelling motion is transformed into a horizontal travel motion. For this, the conveyor device appropriately has side pressure means and in particular pressure rollers which can be acted upon by the saw during swivelling and which serve to transfer the swivelling motion to the horizontally movable conveyor device.

BRIEF DESCRIPTION OF THE DRAWINGS

Further features and advantages of the present invention will be understood from the subsequent description of a preferred embodiment on the basis of the drawings, wherein.

DETAILED DESCRIPTION OF THE PREFERRED EMBODIMENTS

Figure 1:
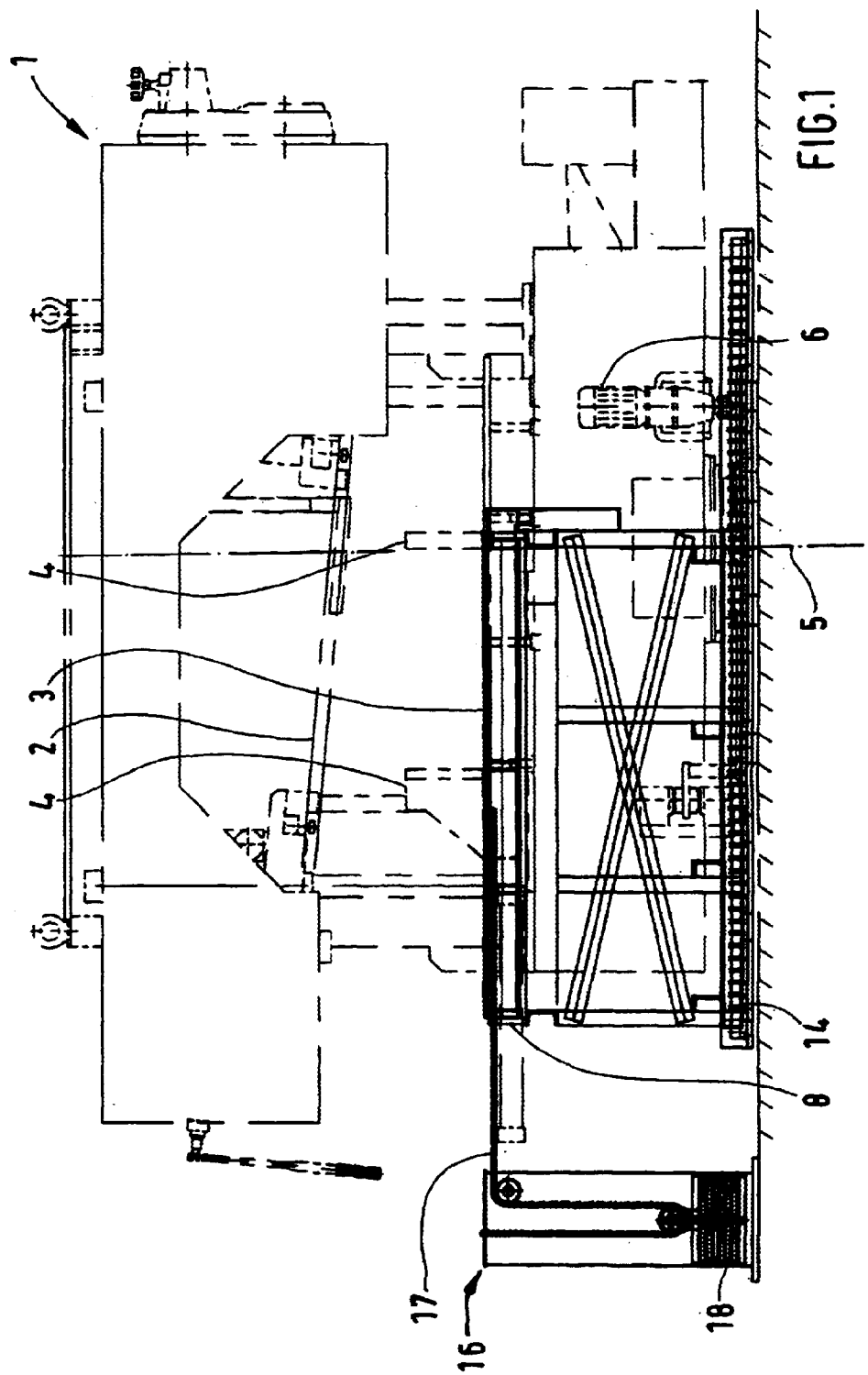
FIG. 1 is a side view of a miter-box saw with a conveyor device in accordance with the invention.

FIG. 1 shows A side view of the miter-box saw 1 which is constructed as a horizontal band saw. The miter-box saw has a saw band 2 inclined a few degrees above the horizontal which in the inclined position serves to optimize the sawing of flat, four cornered and contoured material. A vise 4 is provided for fixing the workpiece to be processed (not represented in FIG. 1) which is positioned on a work table 3. The right clamping jaw in FIG. 1 coincides with a vertical axis 5 about which the miter-box saw is swiveled to generate inclined saw cuts.

Figure 2:
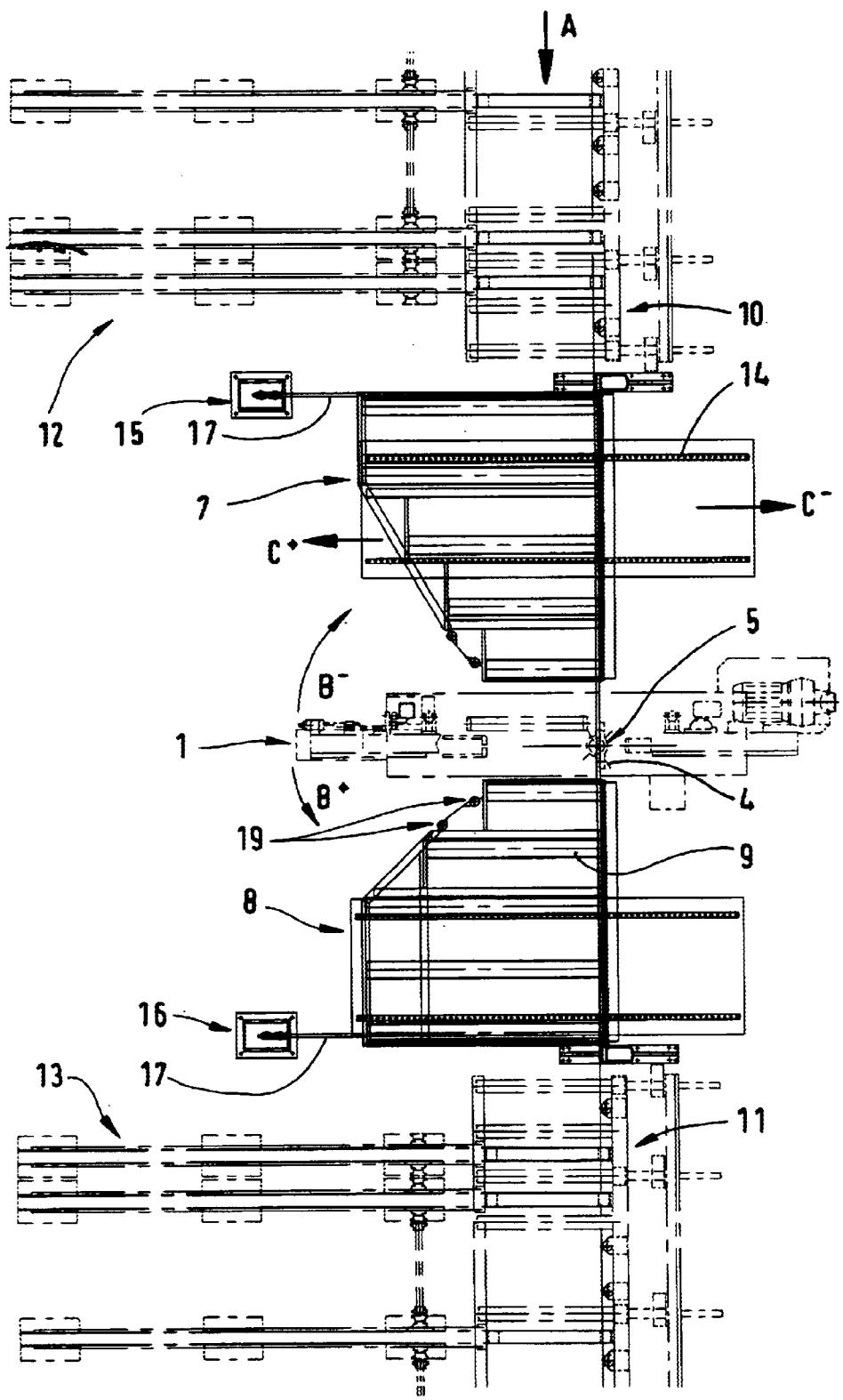
FIG. 2 is a plan view of a miter-box saw with inlet and outlet side conveyor devices from FIG. 1 in an the initial position.
Figure 3:
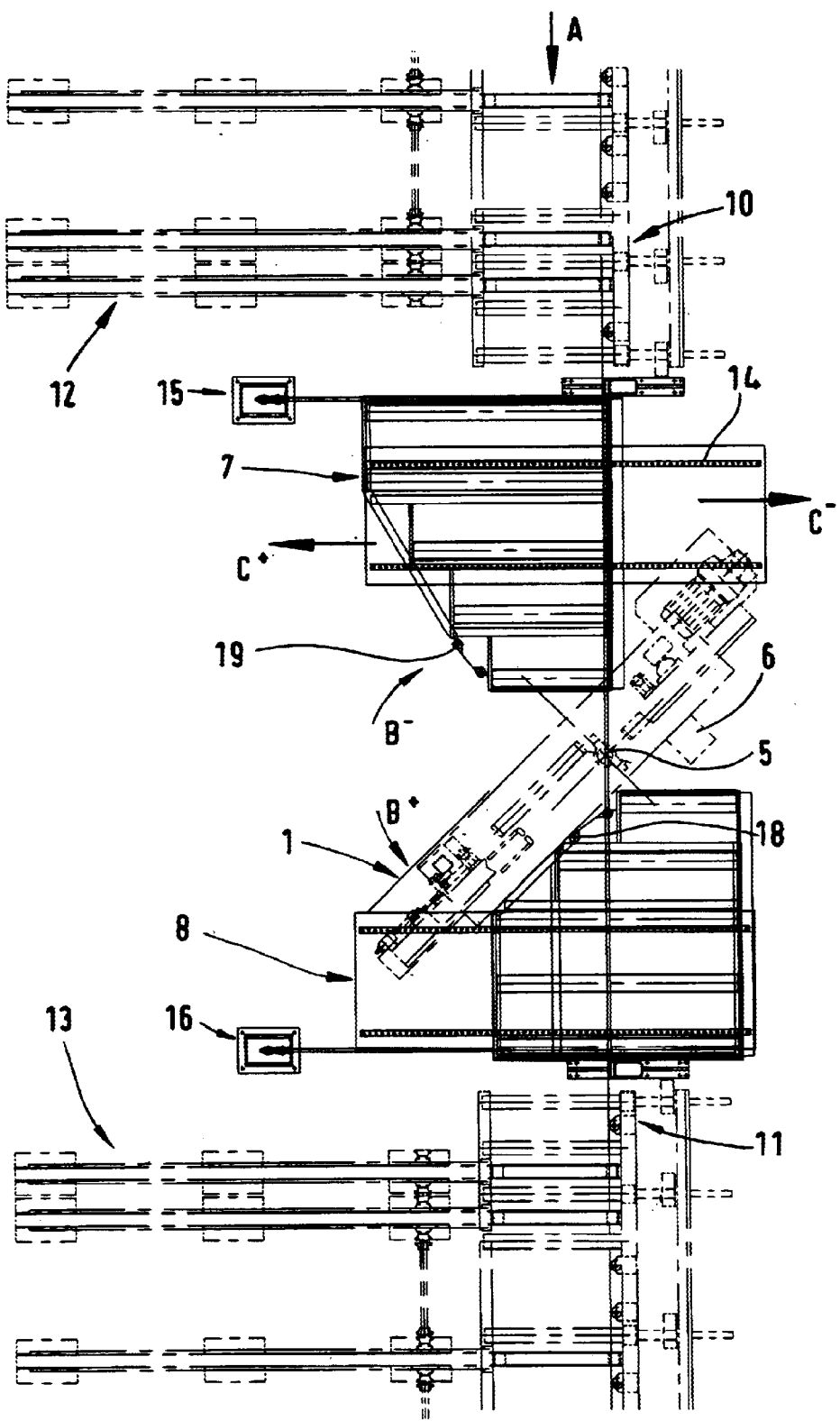
FIG. 3 is a view of the entirety of the miter-box saw and conveyor devices from FIG. 2 in the +45° deflected position of the miter-box saw.
Figure 4:
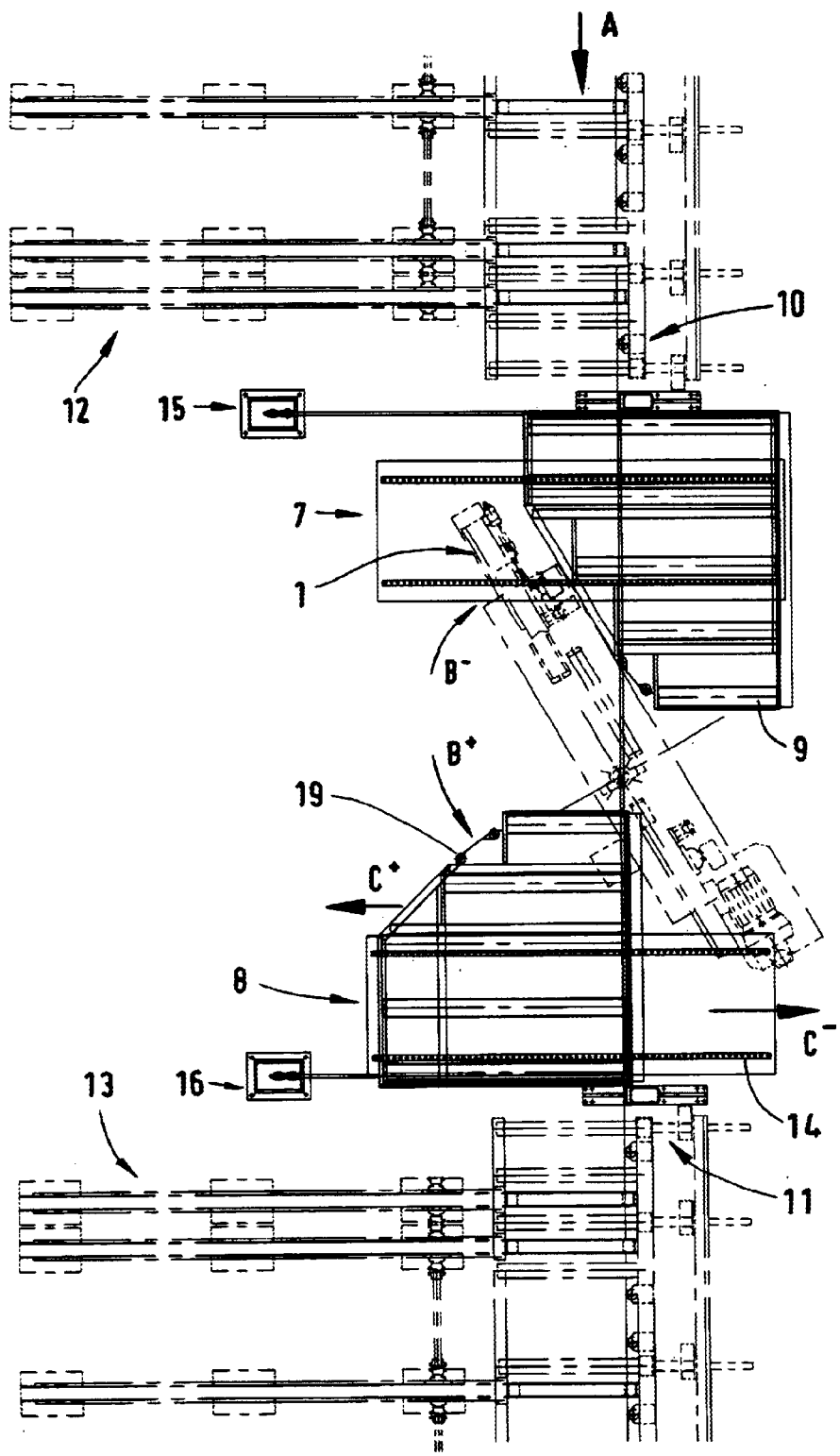
FIG. 4 is a view of the entirety of the miter-box saw and conveyor devices from FIG. 2 in the −60° deflected position of the miter-box saw.

The pivoting motion of the miter-box saw which is especially apparent from FIGS. 2 to 4 is triggered by a pivot drive 6. Here the miter-box saw is pivotable relative to the conveyor device by up to +45° in the one direction and up to −60° in the other direction in relation to the initial position represented in FIG. 2. In this initial position, the miter-box saw executes a 90° cut and operates here like a typical band saw machine for straight cuts.

From FIGS. 2 to 4, an inlet side conveyor device 7 and an outlet side conveyor device 8 are now recognizable, which in any given case are comprised of a roller train with several driven conveyor rollers 9. At all times bordering on the conveyor devices, stationary roller trains 10 on the inlet and outlet sides are provided as well as magazine facilities 12, 13 for storing the workpieces to be fabricated or processed.

Conveyor devices 7 and 8 are in each cases mounted on linear guides and movable over these in a horizontal direction perpendicular in relation to the conveyance direction indicated in FIGS. 2 to 4 by arrow A in order to avoid the pivoting motion of miter-box saw 1 indicated by arrows B in FIGS. 2 to 4.

For clarification of the pivoting and travel motions, the B arrows are subdivided in FIGS. 2 to 4 into an arrow $B^+$ to indicate a counterclockwise pivoting motion of the miter-box saw in the direction of conveyance direction A, and a $B^-$ for clarification of a clockwise pivoting motion, counter to conveyance direction A. Likewise, the horizontal travel motion of conveyor devices 7 and 8 is indicated by an arrow C, which is broken down into an arrow $C^+$ for the motion out of the alternative position back in the direction of the initial position.

Conveyor rollers 9 of conveyor devices 7 and 8 are constructed for adaptation to the pivoting range of miter-box saw 1 with increasing breadth and stepped outer contour. That means the further away the conveyance rollers 9 of conveyor devices 7 and 8 lie from miter-box saw 1, the wider they are, whereby they are also wider than the conveyance rollers of the stationary roller trains 10 and 11 in order to be able to compensate for lateral travel in the direction of arrow $C^-$. Altogether, the stepped outer contour of conveyor devices 7 and 8 forms an inclined edge corresponding to the maximal swivel motion of the miter-box saw, in order in this way to be able to make the maximum use of the conveyance area outside the pivoting area.

The lateral travel motions of conveyance devices 7 and 8 are generated as follows: Through a tension station 15, 16, each of which is allocated to one of the two conveyor devices, the conveyor devices are pressed in direction $C^+$ against a stop into the initial position and lie on this stop under a preload. If the miter-box saw 1 is swivelled in direction $B^+$ or $B^-$ against one of the two conveyor devices, the saw acts with its lateral surface on a pressure roller 19 which projects against the lateral surfaces of the conveyor devices and serves to transmit the pivoting motion of the saw to the conveyor device. The direct seating of the saw on the impression roller or on several impression rollers, and consequently on the conveyor device, leads, upon continuation of the pivoting motion, to the associated conveyor device being moved in direction $C^-$ against the preloading force, whereby this preloading ensures that the conveyor device and the associated pressure rollers are always located in position on the lateral surface of the saw, until the saw is pivoted back again and the conveyor device is moved in direction $C^+$ against the stop into the initial position.

The structure of the tension stations 15, 16 is especially apparent on the basis of FIG. 1, where a chain 17 is connected to conveyor device 8 and extends through idler rollers to weights 18, which are suspended on chain 17. The weights 18, due to their downward-acting weight force pull chain 17 to the left in relation to FIG. 1, and consequently pull the conveyor device 8 against the previously mentioned stop.

The linear guides 14, which have an extremely low rolling resistance, favor this drive principle of the conveyor devices, since first of all the swivelling motion of the miter-box saw is not opposed by too great a resistance in the travel of the conveyor devices, and since secondly the force, due to weight of weights 18, suffices to press the conveyor devices under preload against the stop in the corresponding initial position.

In sum, the present invention offers the advantage that conventional conveyor devices for miter-box saws can be manufactured and operated with the simplest construction and expenditure, and especially without separate control units for actuating this travel drive. In this way, the manufacturing costs of known roller tracks near the machine which function as a conveyor device for the miter-box saw can be considerably reduced.

What is claimed is:

1. A conveyor device for a miter-box saw, comprising a conveyor device (7, 8) arranged on an inlet and/or an outlet side of a miter-box saw (1) that is pivotable in a horizontal plane, the conveyor device is adapted to transport a workpiece to be processed to the saw or away from the saw, the conveyor device is arranged for horizontal travel in a direction ($C^+$, $C^-$) perpendicular in relation to a direction of conveyance (A) in order to be able to evade any swiveling ($B^+$, $B^-$) of the saw, the horizontal travel ($C^+$, $C^-$) of the conveyor device takes place at least in part in a direction of travel due to the swiveling movement ($B^+$, $B^-$) of the saw,
   wherein the conveyor device (7, 8) is preloaded so that it lies against a stop in an initial position, and the conveyor device, due to the swiveling motion ($B^+$, $B^-$), is moveable into an alternative position, and through a drive device (15, 16) which generates a preload in an opposite direction, is moveable back into the initial position.

2. The conveyor device according to claim 1, wherein the drive device (15, 16) which generates the preload comprises a tension station having a weight (18) connected to a chain (17) on the conveyor device (7, 8) to generate the preload.

3. The conveyor device according to claim 1, wherein the conveyor device (7) comprises a roller train with a plurality of driven conveyor rollers (9).

4. The conveyor device according to claim 3, wherein the conveyor rollers (9) of the conveyor device (7, 8) arranged further from the saw (1) are wider than roller trains (10, 11) corresponding to a conveyance area for compensation for the horizontal travel of the conveyance device (7) relative to a conveyance range proper.

5. The conveyor device according to claim 1, wherein a separately drivable conveyor device (7, 8) is arranged on each side of the saw (1).

6. The conveyor device according to claim 1, wherein the conveyor device (7, 8) is mounted on and conveyable over linear guides (14).

7. The conveyor device according to claim 1, wherein the conveyor device (7, 8) has a side pressure roller (17) which is adapted to be acted upon by the saw (1) during swiveling ($B^+$, $B^-$) and transmits the swiveling motion to the horizontally movable ($C^+$, $C^-$) conveyor device.

8. A conveyor device for a miter-box saw, comprising a conveyor device (7, 8) arranged on an inlet and/or an outlet side of a miter-box saw (1) that is pivotable in a horizontal plane, the conveyor device is adapted to transport a workpiece to be processed to the saw or away from the saw, the conveyor device is arranged for horizontal travel in a direction ($C^+$, $C^-$) perpendicular in relation to a direction of conveyance (A) in order to be able to evade any swiveling ($B^+$, $B^-$) of the saw, the horizontal travel ($C^+$, $C^-$) of the conveyor device takes place at least in part in a direction of travel due to the swiveling movement ($B^+$, $B^-$) of the saw, wherein the conveyor device (7, 8) is mounted on and conveyable over linear guides (14).

9. The conveyor device according to claim 8, wherein the conveyor device (7, 8) is preloaded so that it lies against a stop in an initial position, and the conveyor device, due to the swiveling motion ($B^+$, $B^-$), is moveable into an alternative position, and through a drive device (15, 16) which generates a preload in an opposite direction, is moveable back into the initial position.

10. The conveyor device according to claim 9, wherein the drive device (15, 16) which generates the preload comprises a tension station having a weight (18) connected to a chain (17) on the conveyor device (7, 8) to generate the preload.

11. The conveyor device according to claim 8, wherein the conveyor device (7) comprises a roller train with a plurality of driven conveyor rollers (9).

12. The conveyor device according to claim 11, wherein the conveyor rollers (9) of the conveyor device (7, 8) arranged further from the saw (1) are wider than roller trains (10, 11) corresponding to a conveyance area for compensation for the horizontal travel of the conveyance device (7) relative to a conveyance range proper.

13. The conveyor device according to claim 8, wherein a separately drivable conveyor device (7, 8) is arranged on each side of the saw (1).

14. The conveyor device according to claim 8, wherein the conveyor device (7, 8) is mounted on and conveyable over linear guides (14).

15. The conveyor device according to claim 8, wherein the conveyor device (7, 8) has a side pressure roller (17) which is adapted to be acted upon by the saw (1) during swiveling ($B^+$, $B^-$) and transmits the swiveling motion to the horizontally movable ($C^+$, $C^-$) conveyor device.

16. A conveyor device for a miter-box saw, comprising a conveyor device (7, 8) arranged on an inlet and/or an outlet side of a miter-box saw (1) that is pivotable in a horizontal plane, the conveyor device is adapted to transport a workpiece to be processed to the saw or away from the saw, the conveyor device is arranged for horizontal travel in a direction ($C^+$, $C^-$) perpendicular in relation to a direction of conveyance (A) in order to be able to evade any swiveling ($B^+$, $B^-$) of the saw, the horizontal travel ($C^+$, $C^-$) of the conveyor device takes place at least in part in a direction of travel due to the swiveling movement ($B^+$, $B^-$) of the saw;

wherein the conveyor device (7) comprises a roller train with a plurality of driven conveyor rollers (9); and wherein the conveyor rollers (9) of the conveyor device (7, 8) arranged further from the saw (1) are wider than roller trains (10, 11) corresponding to a conveyance area for compensation for the horizontal travel of the conveyance device (7) relative to a conveyance range proper.

* * * * *